United States Patent Office 3,117,004
Patented Jan. 7, 1964

3,117,004
METHOD OF REMOVING TANNINS FROM VEGETABLE LIQUIDS OF THE BEVERAGE CLASS
William D. McFarlane, 385 Glengrove Ave. W., and Peter D. Bayne, 174 Bowood Ave., both of Toronto, Ontario, Canada; Julian L. Azorlosa, 2335 Park Ave., Easton, Pa.; and Anthony J. Martinelli, deceased, late of 719 Melton St., Easton, Pa., by E. Jean Martinelli, executrix, Easton, Pa.
No Drawing. Filed June 13, 1961, Ser. No. 116,881
7 Claims. (Cl. 99—28)

This invention relates to removal of tannin class compounds, especially leuco-anthocyanidins, and high molecular weight protein material from vegetable beverages, and is a continuation-in-part of our application Serial No. 69,214, filed November 14, 1960, now abandoned.

The invention may be illustrated by reference to the processing of beer to eliminate such materials which have the effect of producing a chill haze in the beer although obviously the invention is not confined to the processing of beer but applies to other liquids of the beverage class from which it is desired to eliminate this class of compound.

In the brewing of malt worts in the production of beer, it has previously been proposed to add a predetermined amount of a solution of polyvinyl pyrrolidone (hereafter referred to as PVP) to accomplish precipitation of potential haze forming tannins including those of the leuco-anthocyanidin class. This treatment is very effective and most of the PVP is precipitated from the brew along with the precipitated tannins but traces thereof may remain and while PVP is harmless, in some territories food and drug authorities may question the practice.

More recently it has been proposed to treat the beer with hexamethylenediamine adipate ("nylon") which has the effect of adsorbing tannins in an efficient manner and which is not prone to possible objection by the food and drug authorities because of the fact that it does not dissolve in the wort or beer. However, in the manufacture of beer, it is desirable to retain those compounds of hop origin which are identified as isohumulones and which contribute to the bitterness of the beer. It has been found that in the use of "nylon," while it removes tannins including leuco-anthocyanidins, it also removes some of the isohumulones thus causing a substantial loss of these desirable materials. Moreover, some "nylons" have the disadvantage of being leached into the liquid in which they are suspended.

We have found that by employing certain water-insoluble polymers of N-vinyl-α-pyrrolidone which are described in United States Patent 2,938,017, issued May 24, 1960, to Frederick Grosser, and which are characterized by a melting point of at least about 300° C. and by insolubility in water, strong mineral acids, caustic solutions and common organic solvents, are particularly valuable for the removal of tannin class compounds, especially leuco-anthocyanidins and high molecular weight nitrogenous material from liquid media such as beer. These water-insoluble polymers of N-vinyl-α-pyrrolidone which we employ in practicing the present invention are, as stated above, fully described in the United States Patent 2,938,017 and will hereinafter be referred to as "polyvinyl polypyrrolidone," or PVPP. Therefore, in contradistinction to the prior art, we are able to achieve the removal of undesirable tannins while retaining these isohumulones which are desirable for their usable bitter value. Moreover, PVPP is less costly than "nylon" and is relatively much more active. In consequence, we, therefore, achieve a marked economic advantage in its use not only by reason of cost of the product but also because of the lesser amount of PVPP required to be used for the purpose in question.

The invention will be clearly understood by reference to the following detailed specification.

If PVPP is brought into contact with tannin containing liquids, for example, beers, ales, wines, fruit juices, tanning liquors, etc., and the PVPP tannin complex thus formed is removed from the liquid, there results a reduction in the group of tannin compounds known as the leuco-anthocyanidins together with other compounds of this class and high molecular weight protein material. For example, if a commercial lager beer containing 65 p.p.m. leuco-anthocyanidin is treated with varying levels of PVPP, there is achieved a removal of these undesirable materials which is roughly proportional with respect to the concentration of the polyvinyl polypyrrolidone:

| Polyvinyl polypyrrolidone (p.p.m.) | Leuco-anthocyanidins | |
|---|---|---|
| | P.p.m. present | Percent removal |
| 0 | 65 | 00.0 |
| 40 | 60.5 | 7.0 |
| 80 | 49.0 | 24.6 |
| 120 | 42.5 | 36.6 |
| 160 | 33.0 | 49.2 |
| 200 | 29.0 | 55.2 |
| 320 | 22.5 | 65.4 |
| 400 | 14.5 | 77.5 |

Consequently, any degree of leuco-anthocyanidin and, therefore, tannin, may be removed by means of this selective method. That leuco-anthocyanidins are indeed adsorbed on this material may be shown by contacting PVPP with a liquid containing leuco-anthocyanidins, heating the adsorption complex with butanol-HCl on a steam bath for one hour, cooling, separating the insoluble PVPP by centrifugation, concentrating the acidic alcohol extract, and chromatographing the concentrate on paper using Forestal's solvent.

Two zones pertaining to delphinidin and cyanidin are clearly discernible indicating that the tannins of the leuco-anthocyanidin class are indeed selectively adsorbed on this material.

That PVPP is more active on a unit weight basis and more chemically specific than "nylon" is shown in the table hereunder, showing the comparative removal of leuco-anthocyanidins and the isohumulones, which latter are reasonably unaffected by PVPP.

| Adsorbent, equal wts. | Contact Time, hours | Leuco-anthocyanidins | | Isohumulones | |
|---|---|---|---|---|---|
| | | Total p.p.m. | Percent removal | Total p.p.m. | Percent removal |
| Control | | 70 | | 12 | |
| Nylon 66—Sample A | 4 | 21 | 71 | 11 | 12 |
| Nylon 66—Sample B | 3 | 33 | 53 | 8 | 33 |
| PVPP—Sample A | 4 | 6 | 91 | 12 | 3 |
| PVPP—Sample B | 3 | 5 | 93 | 13 | 0 |

These results show clearly the higher capacity of PVPP for tannins of the leuco-anthocyanidin class and that they are more selective with respect to the isohumulones, the latter being adsorbed by "nylon" but reasonably unaffected by PVPP.

General examples of PVPP which may be employed in this regard are illustrated by the examples of the above mentioned United States Patent 2,938,017, as follows:

EXAMPLE I 200 g. N-vinylpyrrolidone and 2 g. sodium hydroxide flakes were heated in a distilling flask at 100 mm. under total reflux for about 3 hours. At this time the temperature rose from 145–146° C. to 190° C. and the refluxing monomer was converted to a white solid. After cooling, the polymer was slurried with water to wash out caustic and unconverted monomer filtered, and dried at 50–60° C. in vacuo.

EXAMPLE II 20,000 g. N-vinylpyrrolidone and 20 g. sodium hydroxide flakes were heated in a distilling flask at 100 mm. under reflux for about 3 hours. At this time the temperature rose from 150° to 190° C. and the refluxing monomer was converted to a white solid. After cooling the polymer was slurried in water to wash out caustic and residual monomer, filtered, and dried.

EXAMPLE III 300 g. N-vinylpyrrolidone and 3 g. sodium methylate were heated in a distilling flask at 100 mm. under reflux for about 3 hours. At this time the temperature rose to about 185° C. and the refluxing monomer was converted to a white solid. After cooling, the polymer was washed with water, filtered and dried.

EXAMPLE IV 100 g. N-vinylpyrrolidone and 4 g. sodium methylate were heated in a distilling flask at 100 mm. under reflux for about one-half hour. At this time the temperature rose from 150°–183° C. and the refluxing monomer was converted to a white solid. After cooling, the polymer was washed with water, filtered and dried.

EXAMPLE V 100 g. N-vinylpyrrolidone and 4 g. potassium hydroxide pellets were heated in a distilling flask at 100 mm. under reflux for about 13 hours. At this time the temperature rose from 150°–190° C. and the refluxing monomer was converted to a white solid. After cooling, the polymer was washed with water, filtered, and dried.

The effective elimination of chill haze materials from beer and other benefits by the use of PVPP is shown in the following examples. For some experiments, samples of beer were obtained from cellar storage at a brewery but for other experiments the beer was produced in a 20 gal. capacity pilot brewery. The pilot brewing operation was standardized as follows and applies to each example.

Mashing and Boiling

A wort (12° B.) specified as all malt, where applicable, is kettle boiled for one and one-half hours with a hopping rate of 0.42 lb. of hops per 25 gal. barrel. At the end of the boiling period, half of the 20 gal. brew is run off through a hop strainer to a Pyrex glass hot wort receiver. Any additions to the kettle, e.g. the addition of PVPP, are made to the remainder and the boiling continued for one minute to ensure complete mixing. The boiling wort is discharged through the hop strainer to a second identical hot wort receiver so the nature of the hot break can be readily observed. The hot break is allowed to settle for 30 minutes in the vessels and the clear supernatant wort cooled to 69° F. using a plate heat exchanger.

Fermentation, Storage and Bottling

The cooled wort is collected in 5 gallon stainless fermenters and with agitation fermented down to end-gravity (2.3 to 2.5° B.) in 3 days at a constant temperature of 50° F. for lager and 65° F. for ale. The fermenters are cooled to 45° F. overnight to allow the yeast to settle and the supernatant beer transferred under $CO_2$ to 2½ gallon Pyrex storage bottles. The beer is then held at 35° F. for 5 days, filtered through a single cellulose sheet in a Carlson plate filter, carbonated at 30 lbs. pressure for 15 minutes and filled, under a counter pressure of $CO_2$, into regular beer bottles. Air from the head space of each bottle is expelled by knocking and over-foaming. The bottles are capped and pasteurized at 145° F. for 15 minutes. The experimental products did not receive the usual treatment with potassium metabisulphite and enzyme chillproof.

Analytical Measurements

Chill haze is measured on beers chilled to 32° F. in a constant temperature bath, the readings being made with an electric photometer and calibrated to express hazes as p.p.m. $SiO_2$ in water. Isohumulones are determined by the method of Rigby and Bethune (Journal of the Institute of Brewing, volume 61, pages 322, 325, 1955). Colour is determined by the official American Society of Brewing Chemists Method and is expressed as Lovibond units. The foam index is determined by the collapse-rate method described in the American Society of Brewing Chemists, 1952 proceedings. A higher value and, therefore, a higher rate of collapse indicates a poor foam. Leuco-anthocyanidins are determined by the method of Harris and Ricketts (Journal of the Institute of Brewing, volume 65, page 331, 1959).

The effect of different levels of PVPP on a commercial ale may be shown by the following examples:

INSOLUBLE POLYVINYL POLYPYRROLIDONE—EXAMPLE NO. 1

[Additions made to 10 l. portions of a commercial all malt ale taken from warm storage Samples held at 37° F. for 48 hours with the appropriate additions. Filtered, carbonated and bottled]

| | Insoluble polyvinyl polypyrrolidone, lbs./100 bbls. | Foam index | Iso-humulones (p.p.m.) | Colors | Leuco-anthocyanidin (p.p.m.) | Percent removed | Chill haze | |
|---|---|---|---|---|---|---|---|---|
| | | | | | | | 85 hr. | 123 hr. |
| A | Control | 8.6 | 15.3 | 3.40 | 72 | X | 11 | 13 |
| B | 1 | 8.4 | 15.4 | 3.30 | 63.5 | 11.8 | 5 | 6 |
| C | 2 | 9.1 | 14.4 | 3.25 | 54 | 25 | 0 | 1 |
| D | 3 | 8.9 | 15.9 | 3.25 | 48 | 35.3 | 0 | 0 |
| E | 4 | 8.7 | 15.3 | 3.20 | 44.5 | 38.2 | 0 | 0 |
| F | 5 | 9.5 | 14.9 | 3.30 | 44.0 | 39.0 | 0 | 0 |
| G | 6 | 8.9 | 16.1 | 3.25 | 41.0 | 43.1 | 0 | 0 |
| H | 7.5 | 9.4 | 14.5 | 3.10 | 29.0 | 57.3 | 0 | 0 |
| I | 10 | 9.2 | 15.1 | 3.15 | 21.0 | 70.8 | 1 | 0 |
| J | 15 | 9.4 | 15.9 | 3.05 | 15.0 | 74.2 | 0 | 0 |

The above data obtained with 10 liter samples of commercial ruh storage beer shows that PVPP will chillproof and stabilize beer by means of tannin removal without affecting other vital characters of the beverage. The examples clearly show that some of these vital characters such as foam retention, isohumulone content and colour are not appreciably affected by this treatment. Bottled beers from these experiments were tasted by a panel of expetrs who preferred the PVPP treated beers and found them less astringent, cleaner tasting, with a more pleasant hop flavour.

INSOLUBLE POLYVINYL POLYPYRROLIDONE—EXAMPLE NO. 2

[Ale wort, brewed in pilot brewery and divided into two fermenters. Cellar treatment as below]

| Sample | Leuco-anthocyanidins (p.p.m.) | Percent removal | Chill haze (p.p.m. SiO₂) | Pasteurization haze (p.p.m. SiO₂) | 5 day incubation haze (p.p.m. SiO₂) |
|---|---|---|---|---|---|
| Control Ale | 60 | | 40+ | 0 | 1 |
| PVPP added in storage, 1 lb./25 bbl | 37 | 38 | 1 | 0 | 1 |

Example No. 2 shows that if ale in storage is treated with PVPP at a rate of 4 lbs. per hundred barrels, it will be completely stabilized with respect to haze formation. The chill haze, in comparison to the untreated control, is virtually eliminated, and higher temperatures including those for pasteurization do not affect the stability of the treated beer. A taste panel concluded that the treated sample had a better flavour with a cleaner after-bitter than the control sample.

The advantages of using polyvinyl pyrrolidone in the kettle, as described in United States Patent No. 2,939,791, may be effectively combined with the further addition of PVPP to the beer after fermentation as an effective two-step treatment giving the advantages of both. The following example serves to illustrate this point.

INSOLUBLE POLYVINYL PYRROLIDONE—EXAMPLE NO. 3

[Ale wort, divided into two portions at the kettle, the 2nd half treated with PVP-K-90 (120 p.p.m.), and divided into four fermenters. Cellar treatment as below]

| Sample | Leuco-anthocyanidins (p.p.m.) | Percent removal | Chill haze 120 hr. (p.p.m. SiO₂) | Incubation haze, (p.p.m. SiO₂) | Isohumulones (p.p.m.) | Loss of isohumulones, percent |
|---|---|---|---|---|---|---|
| Untreated Control | 54 | | 30 | 2 | 12.6 | |
| Nylon 66 in storage, 1 lb./5 bbl | 20 | 63 | ¹4 | ¹4 | 11.8 | 6.35 |
| PVP in kettle, PVPP in storage, 1 lb./5 bbl | 7 | 89 | ¹2 | ¹2 | 12.4 | 1.59 |
| PVP in kettle, PVPP in storage, 1 lb./5 bbl | 11 | 81 | ¹3 | ¹3 | 12.3 | 2.38 |

¹ These samples gave the same haze readings before chilling or pasteurizing, hence no chill haze or pasteurization haze was formed.

The combination treatment with PVP and PVPP will effectively chillproof the resultant product. The combination treatment was as effective in this respect as nylon alone and without the attendant greater loss of isohumulones with the latter treatment. Finally, the tannin removal expressed as leuco-anthocyanidins, was 26% greater with PVPP than with an equal weight of nylon. Also levels of PVPP as low as 4 lbs. per hundred barrels of beer will effectively complete the stabilization of the beer after preliminary treatment of the wort in the kettle with PVP.

PVPP may advantageously be added to the wort as it leaves the lauter-tun or to the wort in the kettle, holding vessel, hop jack, or wort filter. The remarkable results obtained by use of PVPP in the treatment of brewer's wort are due to (a) its insolubility in the wort and (b) its marked indifference to isohumulones. The following example is illustrative of the use of PVPP in the treatment of brewer's wort.

It will be noted that the removal of tannins, expressed as p.p.m. leuco-anthocyanidins, is in the same order as was obtained by treating beer in the cellar and that a marked degree of chillproofing has been obtained by the treatment. It is possible, as with treating the beer in cellar storage, to effect greater levels of tannin removal by using correspondingly larger amounts of PVPP and thereby achieve a greater degree of chillproofing. Notwithstanding the stabilization achieved, the "isohumulone sparing" effect of adding PVPP in the kettle is very striking. In the boiling of brewer's wort with hops, isohumulones are extracted into the wort and a portion thereof become adsorbed on a tannin protein complex during what is known in the trade as the "kettle" or "hot break," which complex precipitates during the boil and eliminates by this route a portion of these valuable bittering substances. We have found that if tannins are eliminated by other means, the protein-tannin-isohumulone complex, which ordinarily might be eliminated, remains in the wort and contributes to the total bitter value of the finished beer. If the tannins are eliminated by a selective agent like PVPP, a greater amount of isohumulone will remain in the wort and be detectable in the finished beer. This effect is convincingly illustrated by the above example in which the isohumulone content increased 38% over the untreated control made from the same wort.

PVPP may be added in the solid or powdered state, or as an aqueous slurry or emulsion. Alternatively, it can effectively be employed as an active coating on an inert carrier such as silica gel, alumina, talc, diatomaceous earth, etc. Upon removal of the PVPP-tannin complex, the PVPP may be regenerated by desorbing the tannins and can be reused to adsorb tannins without loss of activity, or may be discarded. The following examples are illustrative:

A. PVPP may be slurried with water to form an aqueous suspension of, say, from 1–30% solids content which may then be injected, proportionately, into the tannin containing liquid. Under conditions of turbulence, the reaction between PVPP and tannin takes place instantaneously and the PVPP-tannin complex may be removed by decantation, filtration, or centrifugation. If preferred, the PVPP containing liquid may be held over for a period of time to allow the complex to settle out, the bright liquid being decanted from the sediment. Regardless of

TREATMENT OF BREWER'S WORT WITH INSOLUBLE POLYVINYL POLYPYRROLIDONE IN THE KETTLE—EXAMPLE NO. 4

| | Foam Index | Color, L° | Isohumulones (p.p.m.) | Percent increase | Leuco-anthocyanidins (p.p.m.) | Percent decrease | Chill haze (p.p.m. SiO₂) |
|---|---|---|---|---|---|---|---|
| Control | 9 | 3.5 | 19 | | 46 | | 40+ |
| PVPP in kettle-120 p.p.m. | 11 | 3.8 | 26.2 | 38 | 33 | 24 | 15 | the method used for recovering the spent PVPP, the polymer may be desorbed of tannins and reused.

B. Instead of injection, on a proportional basis, PVPP may be added directly to the tannin-containing liquid by pumping the liquid on top of the polyvinyl polypyrrolidone or slurrying the powder into a vessel containing the liquid to be treated, and allowing the PVPP-tannin complex to settle out. Instead of sedimentation, the spent powder may be filtered or centrifuged from the liquid.

C. PVPP may be used as a filter-aid or filter-bed, in filters or columns, to effect both the clarification and tannin removal from tannin-containing liquids. Again the adsorbed tannins may be desorbed and the PVPP reused.

D. PVPP may be used also in sheet or liner form in bottles, tanks, barrels, vessels in general, in bottle closures, bungs, etc., further to effect tannin removal in case tannins are formed in the beer by chemical reaction during the course of storage.

E. While the methods of addition of PVPP as above outlined are quite effective, we have found it to be more effective, from the physical standpoint, when it is added as a paste, i.e., approximately 65% moisturized and wherein the particle size is smaller than the powdered form obtained from drying and pulverizing the material.

The addition of the PVPP in paste form may be accomplished by directly introducing the paste or adding it in the form of a slurry and results show that addition in paste form is at least 50% more effective than in the case of the powder as is confirmed by the following table:

COMPARATIVE ADSORPTION ACTIVITY OF "AGENT AT" POWDER AND "AGENT AT" PASTE

|  | Anthocyanogens | | Increased activity of paste over powder, percent |
|---|---|---|---|
|  | P.p.m. | Percent removed |  |
| TEST I |  |  |  |
| Ale A (77 p.p.m. anthocyanogens): |  |  |  |
| (a) 17 mg.[1] Agent AT powder | 60 | 22.2 | 58 |
| (b) 52 mg.[1] Agent AT paste | 50 | 35.1 |  |
| TEST II |  |  |  |
| Ale B (75 p.p.m. anthocyanogens): |  |  |  |
| (a) 17 mg. Agent AT powder | 63 | 16.0 | 75 |
| (b) 52 mg. Agent AT paste | 54 | 28.0 |  |

[1] Equal amounts of Agent AT on a dry weight basis. The paste contains 33% dry solids.

Other advantages of using PVPP in paste form will be apparent when it is realized that the paste form disperses in beer more readily than the powder and since the powder is deliquescent and could take up sufficient moisture in storage to cause miscalculation of the amount to be used, this possibility is avoided by use in paste form.

Notwithstanding the fact that the so-called "paste" contains about 65% moisture, it still is remarkably friable and has a powdery texture. Hence it can be conveniently transported and handled in a polyethylene container.

By test we have found that commercial samples of PVPP have the property of not being soluble in any solvent tested, including water, alcohol, acid, alkali, or any of the common organic solvents. In fact, they are such stable and inert compositions that they may be heated to 150° C. in concentrated sulphuric acids without decomposition. By comparison, some nylons have the characteristic of being slightly soluble in aqueous or dilute alcohol solutions and hence are not compatible with food or beverage use.

Because of its remarkable stability, PVPP may be treated with strong chemical agents to desorb tannins which are physically and chemically bound to the polymer. For example, we have found that the material can be effectively regenerated by boiling with a 10 percent aqueous solution of sodium hydroxide, which completely extracts adsorbed tannins and proteins. By subsequently boiling with a 10 percent aqueous solution of hydrochloric acid, the PVPP is quantitatively recovered and with its tannin adsorbing activity unimpaired. The continual reuse of the material, thus effected, is a most important factor in the overall economics of the process. Because of the comparative instability of nylon in strong alkalis and acids, the extraction of adsorbed tannins must be carried out with cold dilute alkali solutions such as 0.2 to 0.4 percent sodium hydroxide. This treatment is relatively ineffective and is accompanied by discoloration and loss of nylon and a progressive decrease in its capacity to adsorb tannins.

Due to the specificity of PVPP for adsorbing tannins and its general inertness in respect to other substances, it becomes remarkably suitable for use in admixture with materials for other treatment. For instance, the use of papain proteolytic enzymes to solubilize chill haze material of a tannin-protein nature has been a conventional practice in the brewery for many years. While this treatment effectively chillproofs the finished product, it is nonselective in action and concurrently tends to break down foam proteins. Consequently, the foam retention characteristics of an enzyme treated product are inferior to those of a non-treated product, whereas the use of PVPP, which selectively removes chill haze from beer rather than breaking it down, provides a beer with superior foam retention. Consequently, having regard to the characteristics of PVPP, it has been found eminently suitable for combination with other agents of different chemical action and it can effectively be used in combination with papain proteolytic enzymes for the effective elimination of chill haze while producing a beer having better foam retention characteristics. Hence PVPP can be used to reduce the amount of enzyme chillproof material to a level at which the enzymes would not affect the foam properties of the beverage adversely and tests have shown that PVPP and enzyme chillproof can be added without any sign of incompatability to produce a beer with better form retention characteristics. It can be used not only with enzyme chillproof but in similar manner with derivatives of alginic acid, used as a foam stabilizer, and with inorganic agents capable of imparting free sulphur dioxide such as potassium metabisulphite, sodium dithionite and other commonly used materials, advantageously.

The use of PVPP is not limited to the treatment of tannin-containing malt beverages but to other tannin-containing solutions as well. For example, various wines, brandies, whiskies, fruit juices, pharmaceutical liquors, and other tannin-containing solutions may be effectively treated with PVPP. The following example, in which a commercial, ready-for-bottling, port wine was used, is further illustrative of the flexibility and novelty of this invention.

TREATMENT OF PORT WINE WITH POLYVINYL POLYPYRROLIDONE—
EXAMPLE NO. 1

[50 ml. portions of port wine were treated with varying amounts of PVPP, held at 35° F. for 72 hrs., the complex removed by centrifugation and the clear supernatant analyzed]

| Lbs. PVPP/ 1000 gal. | pH | Color [1] | Percent decolorization | Leuco- anthocyanidins (p.p.m.) | Percent removal |
|---|---|---|---|---|---|
| 0 | 2.95 | 82 |  | 86 |  |
| 1 | 2.90 | 79 | 3.66 | 81 | 5.8 |
| 2 | 2.90 | 76 | 7.32 | 75 | 12.8 |
| 3 | 2.95 | 74 | 9.76 | 69 | 19.8 |
| 5 | 2.85 | 66 | 19.51 | 65 | 24.4 |
| 10 | 2.90 | 54 | 34.15 | 52.5 | 39.0 |
| 20 | 2.95 | 33 | 59.75 | 30.0 | 65.1 |
| 50 | 2.90 | 32.5 | 60.36 | 12.5 | 85.0 |
| 100 | 2.99 | 30.0 | 63.34 | 5 | 94.0 |

[1] Optical density at 550 mµ.

It may be clearly seen that PVPP is an especially effective tannin removing agent, particularly with respect to the coloured bodies of wine, the anthocyanidins and the oxidizable leuco-anthocyanidins, both of which belong to the tannin class of compounds. As can be seen, any degree of tannin removal and, therefore, anthocyanidin and colour body removal, may be effected without changing the basic qualities of the wine. Other methods have been proposed to stabilize wine by tannin removal, viz. ion-exchange, but these methods tend to be too drastic and affect the taste and general quality of the wine. Treatment with PVPP, as can be seen in Example 1, does not change the pH of the wine. The level of tannin removal from this wine, expressed in terms of the leuco-anthocyanidin and anthocyanidin class compounds, is roughly proportional to the pigment bodies removed and related to the amount of PVPP used in the treatment.

Thus, tannin class compounds while desirable for their colour in coloured wine types, often oxidize and are deposited in the bottle as what is known in the trade as "pigment throw-down" which is undesirable from the consumer acceptance standpoint. Furthermore, they form hazes in wines on chilling and complex with heavy metals to cause off-colours and turbidities in the bottled wine. From a taste standpoint, these tannins have an astringent biting taste and their removal, or partial removal, gives a blander, more mellow tasting product without undue ageing. Thus, in a single fast treatment, it is possible to achieve stability in wines by regulating their tannin content within the limits determined by colour and taste standards. In many cases, lower levels of treatment may be perfectly satisfactory as evidenced by the following example:

TREATMENT OF PORT WINE WITH POLYVINYL POLYPYRROLIDONE—EXAMPLE NO. 2

[10 l. of commercial port wine were treated with 500 p.p.m. PVPP, held at 35° F. for 1 week, filtered, bottled and pasteurized. Another 10 l. sample of the same wine was treated identically except that the PVPP treatment was omitted]

| Sample | pH | Color [1] | Percent decolorization | Leuco-anthocyanidins, p.p.m. | Percent removal | Chill haze |
|---|---|---|---|---|---|---|
| Control | 2.95 | 65 | | 126 | | Turbid. |
| PVPP, 5 lb./1000 gal. | 3.00 | 51 | 21.5 | 86 | 31.7 | Clear. |

[1] Optical density at 550 mµ.

These wines were submitted to a panel of experts for taste examination. They preferred the treated samples which were more bland and less harsh or astringent in character. Moreover, the treated wine was resistant to haze formation on chilling and it is thought that this treatment could drastically shorten the storage time for wines without loss of stability or flavour.

While our invention has thus far been specifically described in connection with the use of polyvinyl polypyrrolidone for treating vegetable beverages, since this material is presently available, it is to be understood that we may use in place thereof, analogous insoluble polymers which are obtained by treating analogous N vinyl lactams in a manner analogous to that in which N vinyl pyrrolidone is treated in United States Patent No. 2,938,017. Such polymers (including polyvinyl polypyrrolidone) are hereinafter referred to as "polymeric N vinyl polylactams," and as stated are obtained when monomeric N vinyl lactams, represented by the general formula

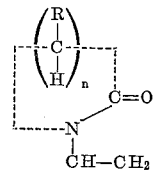

wherein $n$ represents one of the integers 3, 4 or 5 and R represents hydrogen, methyl or ethyl, are treated in the same manner as is described in United States Patent 2,938,017 for producing polyvinyl polypyrrolidone from N vinyl pyrrolidone.

The monomeric N vinyl lactams used for the production of such insoluble polymers may be produced in the manner described in United States Patent 2,317,804. As examples of such other polymeric N vinyl polylactams, which may be used in place of or in combination with polyvinyl polypyrrolidone, in practising the present invention, may be mentioned the polymeric N vinyl polylactams of N vinyl 5 methyl pyrrolidone, N vinyl caprolactam, N vinyl piperidone.

What we claim as our invention is:

1. The method of removing tannins from vegetable liquids of the beverage class which comprises contacting said vegetable liquid with a polymeric N vinyl polylactam obtained by heating an N-vinyl lactam to a temperature of from about 40° C. to 200° C. in the presence of a small amount of an alkali polymerization catalyst to cause adsorption of tannins thereby.

2. The method of removing tannins from vegetable liquids of the beverage class which comprises introducing a polymeric N vinyl polylactam obtained by heating an N-vinyl lactam to a temperature of from about 40° C. to 200° C. in the presence of a small amount of an alkali polymerization catalyst to a vegetable liquid to cause adsorption of tannins thereby and then removing the polymeric N vinyl polylactam-tannin complex from said liquid.

3. The method of removing tannins from vegetable liquids of the beverage class which comprises contacting said vegetable liquid with polyvinyl polypyrrolidone obtained by heating N-vinyl pyrrolidone to a temperature from about 40° C. to 200° C. in the presence of an alkali metal polymerization catalyst to cause adsorption of tannins thereby.

4. The method of removing tannins from vegetable liquids of the beverage class which comprises introducing polyvinyl polypyrrolidone obtained by heating N-vinyl pyrrolidone to a temperature from about 40° C. to 200° C. in the presence of an alkali metal polymerization catalyst to a vegetable liquid to cause adsorption of tannins thereby and then removing the polyvinyl polypyrrolidone-tannin complex from said liquid.

5. The method of removing tannins from vegetable liquids of the beverage class which comprises introducing to said vegetable liquid a polymeric N vinyl polylactam obtained by heating an N-vinyl lactam to a temperature of from about 40° C. to 200° C. in the presence of a small amount of an alkali polymerization catalyst in paste form to cause adsorption of tannins thereby.

6. The method as claimed in claim 5 wherein proteolytic enzyme chillproof material is added in co-related proportion to the amount of polymeric N vinyl polylactam.

7. The method as claimed in claim 5 in which the polymeric N vinyl polylactam is employed as an active coating on an inert carrier.

References Cited in the file of this patent

UNITED STATES PATENTS 2,947,633     Perry et al. _____ Aug. 2, 1960